US006940682B2

(12) United States Patent
Bui et al.

(10) Patent No.: US 6,940,682 B2
(45) Date of Patent: Sep. 6, 2005

(54) DATA READ TRANSDUCERS FOR DETERMINING LATERAL POSITION OF A TAPE HEAD WITH RESPECT TO LONGITUDINAL SERVO BANDS OF MAGNETIC TAPE

(75) Inventors: Nhan Xuan Bui, Tucson, AZ (US); Robert Allen Hutchins, Tucson, AZ (US); Glen Alan Jaquette, Tucson, AZ (US); Larry Leeroy Tretter, Tucson, AZ (US); Eiji Ogura, Yokohama (JP); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 10/660,436

(22) Filed: Sep. 10, 2003

(65) Prior Publication Data

US 2005/0052778 A1 Mar. 10, 2005

(51) Int. Cl.[7] .................... G11B 5/584
(52) U.S. Cl. .................... 360/77.12
(58) Field of Search .................... 360/77.12, 69, 360/70, 71, 72.1, 76, 78.02

(56) References Cited

U.S. PATENT DOCUMENTS

| | | | | |
|---|---|---|---|---|
| 5,008,765 A | | 4/1991 | Youngquist | 360/77.12 |
| 6,222,698 B1 | * | 4/2001 | Barndt et al. | 360/76 |
| 6,580,581 B1 | * | 6/2003 | Bui et al. | 360/78.02 |
| 6,661,600 B1 | * | 12/2003 | Chliwnyj et al. | 360/77.12 |
| 6,674,603 B2 | * | 1/2004 | Basham et al. | 360/77.12 |
| 6,798,607 B2 | * | 9/2004 | Chliwnyj et al. | 360/77.12 |
| 6,798,608 B2 | * | 9/2004 | Chliwnyj et al. | 360/77.12 |
| 6,831,805 B2 | * | 12/2004 | Chliwnyj et al. | 360/77.12 |
| 6,833,973 B2 | * | 12/2004 | Chliwnyj et al. | 360/77.12 |
| 6,865,052 B2 | * | 3/2005 | Chliwnyj et al. | 360/77.12 |

FOREIGN PATENT DOCUMENTS

| | | | |
|---|---|---|---|
| WO | 02/15174 A1 | 2/2002 | G11B/5/584 |

* cited by examiner

*Primary Examiner*—David Hudspeth
*Assistant Examiner*—Fred F. Tzeng
(74) *Attorney, Agent, or Firm*—John H. Holcombe

(57) ABSTRACT

In a magnetic tape system, during lateral repositioning of a tape head between servo bands, the servo head is not on a servo band and is unable to provide servo position information. Hence, information about the lateral position may be lost. A control system selectively senses data read transducers of the tape head; and, upon detecting a servo signal of a servo band from a sensed data read transducer, determines the lateral position of the tape head with respect to the detected servo band based upon the position of the data read transducer that sensed the detected servo signal.

30 Claims, 6 Drawing Sheets

DATA READ TRANSDUCERS FOR DETERMINING LATERAL POSITION OF A TAPE HEAD WITH RESPECT TO LONGITUDINAL SERVO BANDS OF MAGNETIC TAPE

FIELD OF THE INVENTION

This invention relates to servo systems for positioning tape heads laterally with respect to longitudinal servo bands of a magnetic tape, and, more particularly, to prevent, or enable recovery from, loss of lateral position with respect to a plurality of parallel, longitudinal servo bands.

BACKGROUND OF THE INVENTION

Magnetic tape comprises a medium for storing large amounts of data, and typically comprises a plurality of parallel data tracks that extend longitudinally along the tape. A tape head is employed for reading and/or writing data on the data tracks, and is typically shared between various data tracks or groups of data tracks, and is moved between data tracks or groups of data tracks in the lateral direction of the tape. The tape head typically comprises a number of separate data transducers which read and/or write data with respect to a number of parallel longitudinal data tracks. Servo systems are provided to position tape heads laterally to position data transducers over the desired data tracks and to then maintain alignment of the data transducers with respect to the desired data tracks, as the magnetic tape is moved longitudinally with respect to the tape head. The tape head is provided with one or more separate servo heads, which are offset from the data transducers, so as to maintain tape head alignment by track following a servo band of the magnetic tape. A servo head is guided along any of several paths within the band, called "index positions", and the tape head is repositioned laterally within a servo band so that the data transducers access different data tracks. The servo bands may be continuously variable laterally to provide a servo signal which varies continuously as a function of the lateral position of the servo head, allowing a calculation of a Position Error Signal, or "PES".

One type of servo system for magnetic tape media is one in which a plurality of separate servo bands are laterally positioned on the magnetic tape media. Each of the servo bands provides the servo guidance for a group of data tracks, and the servo transducer of the tape head is repositioned laterally within a servo band so the data transducers access different data tracks, and is repositioned laterally to another servo band to access still further data tracks. In one example, the servo bands are spaced apart and the data tracks are located between the servo bands. To insure that the servoing is precise, two servo transducers may be provided at either end of the tape head, straddling the data transducers. The lateral position information may be obtained from either or both servo bands. The servo bands may be encoded with essentially identical patterns for determining lateral position, such that the bands are substantially interchangeable from the point of view of calculation of the PES, or both may be used (e.g. averaged).

The lateral positioning of the tape head is typically accomplished by actuators, which may have mechanical or electromechanical components. Once the proper lateral positioning of the servo head of the tape head over a servo band has been accomplished, as the servo information being sensed by the servo head indicates, minor adjustments of the tape head may be made to track follow lateral movement of the tape or of the servo bands on the tape.

However, the lateral repositioning of the tape head between the servo bands is typically conducted by a coarse actuator which operates in open loop without feedback. Thus, as the tape head is repositioned between the servo bands, there is no feedback from the servo information to indicate that the tape head has actually moved from one servo band to another servo band. Hence, at the supposed completion of the lateral movement, the servo head of the tape head may be positioned over data tracks instead of a servo band, and the lateral position of the tape head is unknown, and information about the lateral position is "lost", as defined herein. Further, servo information is lost during movement of the servo head between servo bands since the servo head is unable to provide servo information.

One way of determining where the tape head is positioned, is to provide a separate "independent" sensor, for example, that determines the approximate lateral position of the head with respect to the tape. Such an independent sensor may comprise a coarse optical sensor that measures the physical position of the head. Such a coarse sensor cannot typically be used for track following, but provides a backup to the actual servo system should coarse positioning fail to place a servo head of the tape head over a servo band. Such extra sensors add cost to a tape drive, which is always undesirable, if the extra cost can be avoided. Another example is to arbitrarily move the tape head laterally in hopes that the servo head will meet a servo band. It is possible that the tape head has moved to the edge of the magnetic tape and the arbitrary movement will either move the tape head off the magnetic tape, or into an overshoot stop that may be provided.

SUMMARY OF THE INVENTION

The present invention comprises a servo system, a magnetic tape drive, logic, method, and a computer program product for recovery of lateral position. The servo system for a magnetic tape drive positions a tape head laterally with respect to a plurality of parallel, longitudinal servo bands of a magnetic tape. The tape head comprises at least one servo head and a plurality of data read and/or write transducers. The magnetic tape drive comprises a data flow system for reading data sensed by the plurality of data read transducers.

The servo system comprises the servo head(s) positioned on the tape head; servo read channel(s) for detecting servo signals of the servo bands of the magnetic tape; and a servo actuator for positioning the tape head laterally with respect to the magnetic tape. A control system, in normal operation, responds to the detected servo signals of the servo bands from the servo read channel for operating the actuator to position the tape head laterally with respect to the servo bands.

In an embodiment of the present invention, the control system responds to loss of information about the lateral position, operating an agent to selectively direct signals sensed by the data read transducers to the servo read channel(s); and upon a servo read channel detecting a servo signal representing one of the servo bands from a sensed data read transducer, determines the lateral position of the tape head with respect to the servo band based upon the position of the data read transducer that sensed the detected servo signal.

In an embodiment of the present invention, the control system operates the agent to selectively direct signals sensed by the data read transducers to the servo read channel(s) in a sequence.

Where at least one servo head is provided at either lateral side of the plurality of data read transducers of the tape head, in one embodiment of the present invention, additionally determines the direction of motion of the tape head required to move a selected servo head toward the position of the data read transducer having the detected servo signal.

In another embodiment of the present invention, as the tape head is moved laterally, for example between servo bands, such that servo signals are no longer detected by the servo head and servo read channel, the control system operates the agent to direct signals sensed by the data read transducers to a servo channel(s) to monitor the lateral movement of the tape head.

In still another embodiment of the present invention, in response to loss of information about lateral position, and upon operating the agent and servo read channel(s), the control system determines the lateral distance motion required to move a servo head of the tape head laterally to the servo band sensed by the data read transducer, and operates the servo actuator accordingly.

In further embodiments, a computer program product and a method comprise responding to loss of information about the lateral position, operating the servo system to selectively sense the data read transducers of the tape head; and, upon detecting a servo signal representing one of the servo bands from a sensed data read transducer, determining the lateral position of the tape head with respect to the detected servo band based on the position of the data read transducer having the detected servo signal.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While his invention is described in terms of the best mode for achieving this invention's objectives, it ill be appreciated by those skilled in the art that variations may be accomplished in view of these teachings without deviating from the spirit or scope of the invention.

Figure 1:
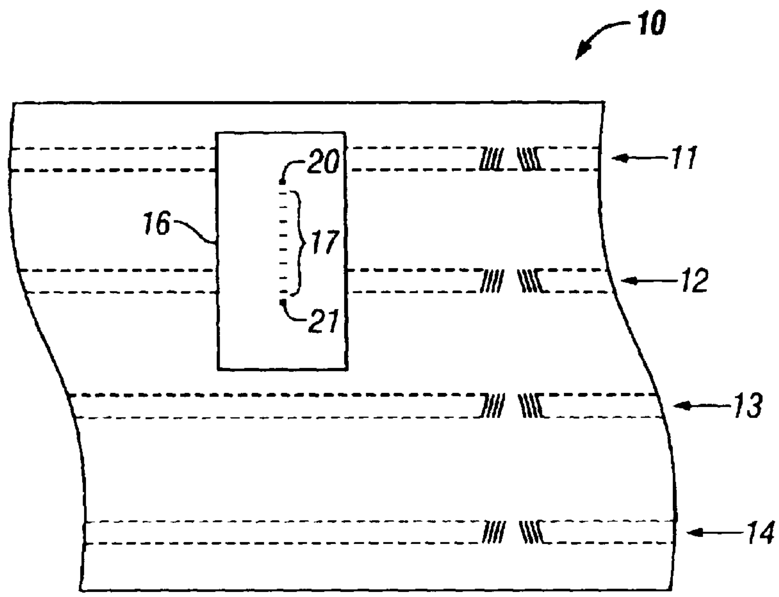
FIG. 1 is a schematic representation of a tape head and a segment of a magnetic tape with a plurality of separate servo bands in accordance with the present invention.

FIG. 1 illustrates a magnetic tape 10, the magnetic tape having a plurality of separate longitudinal servo bands 11, 12, 13 and 14, which are laterally positioned on the magnetic tape, and with data tracks in data bands positioned between the servo bands. In magnetic tape media, a tape head 16 typically comprises a number of separate data read and/or write transducers 17, which read and/or write data with respect to a number of parallel data tracks, and is provided with a separate servo head, or servo heads 20, 21, which are offset from the data read and/or write transducers 17, so as to track follow the servo track and be guided along the data track or tracks.

Figure 2:
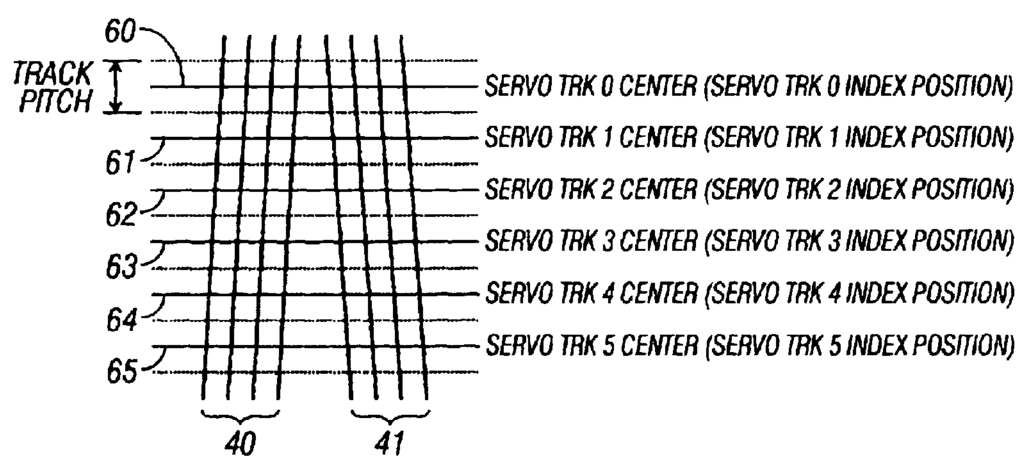
FIG. 2 is a representation of a prior art servo band and index positions of a servo transducer as it tracks the servo bands.

FIG. 2 illustrates one type of prior art servo band comprising a timing based servo pattern of the type described in U.S. Pat. No. 5,689,384, which comprises patterns of transitions recorded at more than one azimuthal orientation across the width of the servo band, and which are therefore non-parallel. The lateral position is determined as a ratio of two servo pattern intervals, one pattern interval employing parallel transitions such as two bursts 40 in separate patterns, and the other pattern interval employing non-parallel transitions such as between burst 40 and burst 41. Each servo band may have a plurality of indexed defined servo positions, such as 6 separate indexed defined servo positions 60, 61, 62, 63, 64 and 65 for a single servo band. Alternative types of servo patterns are known to those of skill in the art, and the present invention may be implemented as well with respect to other servo patterns.

Referring to FIG. 1, the data read and/or write transducers 17 are typically shared between various data tracks or groups of data tracks, and are moved between tracks or groups of tracks in the lateral direction of the tape. Each of the servo bands 11, 12, 13 and 14, provides the servo guidance for a group of data tracks, and the servo head 20, 21 of the tape head is repositioned laterally within a servo band to cause the data read and/or write transducers 17 to access different data tracks within a data band, and is repositioned laterally to another servo band to access still further data tracks in another data band. In one example, the servo bands are spaced apart to span the data tracks, which are located in a data band between the servo bands. This places a servo band close to the corresponding data tracks to reduce the span between the outer read and/or write elements and the servo band, and reduce sensitivity to changes in tape width between the time data is written and read back. To insure that the servo lateral positioning is precise, two servo transducers 20, 21 may be provided at either end of the tape head, straddling the data read and/or write transducers. The lateral positioning may be obtained from either of the two servo bands, or by averaging or otherwise comparing data from the two servo bands.

Figure 3:
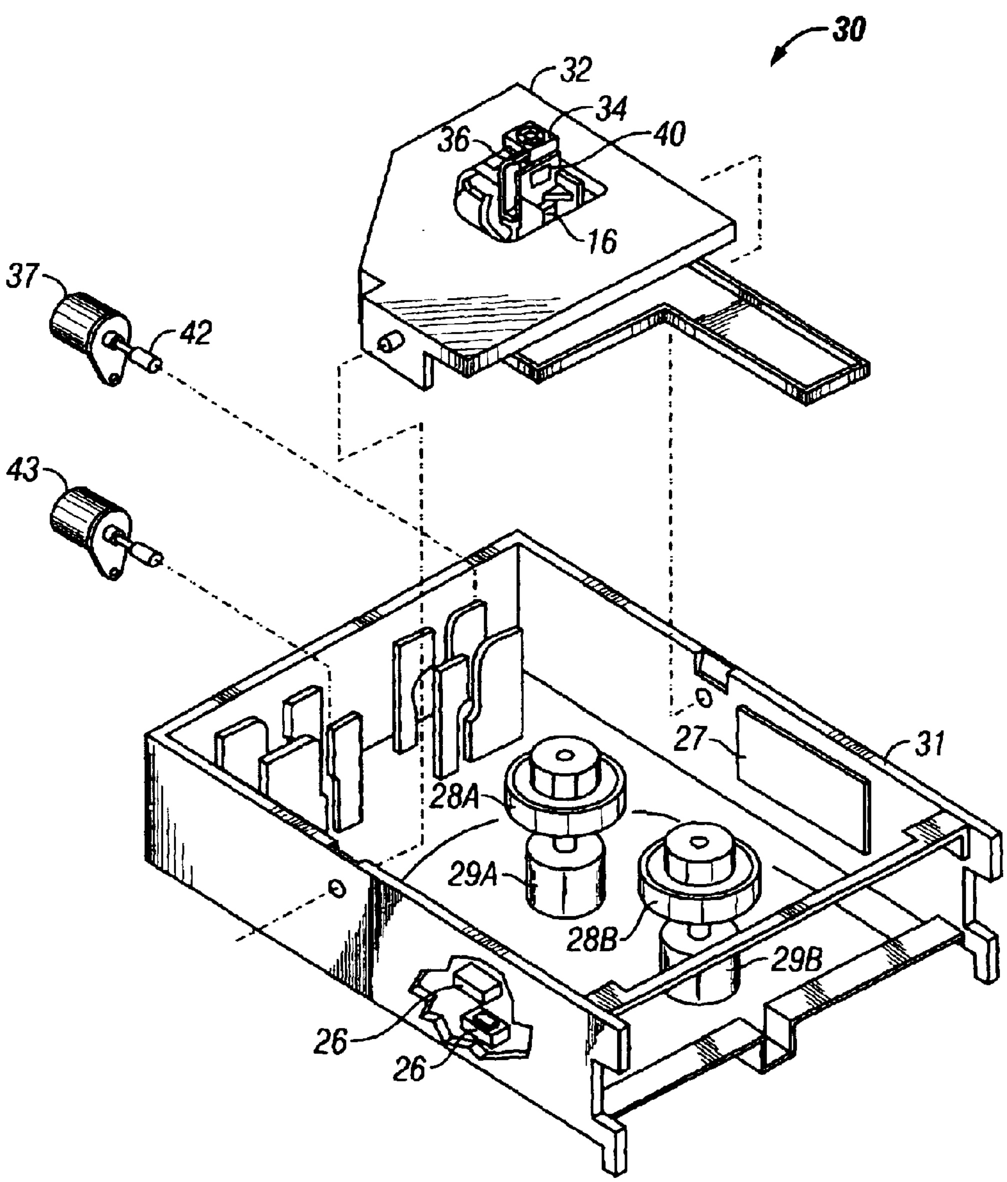
FIG. 3 is a partially exploded isometric view of a prior art magnetic tape drive which may implement the present invention.

Referring to FIG. 3, a magnetic tape drive 30 is illustrated which may implement the present invention. A head and bearing assembly 32 is shown exploded out of the tape drive chassis 31. The tape head 16 is supported by a compound actuator 34. As discussed above, the tape head 16 may comprise a plurality of data read and/or write transducers, and a plurality of servo heads. The compound actuator 34 positions the tape head 16 laterally with respect to the magnetic tape to move the head between the defined servo bands and the index positions within the defined servo bands, and to track follow the desired servo bands. The compound actuator 34 comprises a coarse actuator 36, employing, for example a stepper motor 37, and comprises a fine actuator 40, employing, for example, a voice coil actuator mounted on the coarse actuator. As discussed above, the tape head 16 can be moved between servo bands over a full width of the magnetic tape primarily using the coarse actuator 36, 37, and can track follow the lateral movement of a servo band, primarily using the fine actuator 40 of the compound actuator 34. Those of skill in the art understand that many differing types of actuators and compound actuators may be employed in implementing the present invention. In the illustrated example, the coarse actuator stepper motor 37 positions the tape head 16 through a lead screw 42, such as a worm gear. Alternatively, a single actuator may perform the functions of both the coarse and fine actuators.

The magnetic tape may be provided with a tape cartridge, and a tape cartridge receive/eject stepper motor 43 may provide the drive elements for receiving a ejecting the cartridges. The tape drive 30 may additionally comprise reels 28A, 28B driven by a drive system, comprising motors 29A, 29B, for moving the magnetic tape longitudinally across the tape head 16. A cartridge sensor 26, such as an LED or RF receiver, may be provided to indicate whether a cartridge is present or absent.

A control system 27 provides the electronics modules and processor, with the logic and/or computer readable program code, to implement the present invention.

As discussed above, referring to FIG. 1, the lateral positioning of the tape head is typically accomplished by actuators, which may have mechanical or electromechanical components. Once the proper lateral positioning of the data read and/or write transducers 17 of the head 16 has been accomplished, as the servo information being sensed by the servo transducers 20 and/or 21 indicates, minor adjustments of the head 16 to follow lateral movement of the tape or of the tracks on the tape may typically be made by fine actuation known as track following. During track following, sticking or other failure of the mechanical or electromechanical components can be ascertained from failure of the sensed servo information to show any correction. Similarly, lateral repositioning of the tape head to different tracks within the same servo band is typically accomplished by a continuous adjustment of position within the servo band. Hence, any sticking or other failure of the mechanical or electromechanical components can be ascertained by failure of the sensed servo information to show the desired movement.

However, the lateral repositioning of the head from one of the servo bands 11, 12, 13 and 14, to another, is typically conducted by a coarse actuator, which may have mechanical or electromechanical components, such as a stepper motor, and which typically operates without feedback from the actuator itself, and, during the repositioning, the servo head(s) are not over the servo band(s). Thus, as the tape head is repositioned between the servo bands, there is no feedback from the servo information to indicate that the tape head has moved from one servo band to another servo band. Hence, if sticking has occurred, or if the tape has moved laterally during the resposition, then at the supposed completion of the lateral movement, the servo head of the tape head may be positioned over data tracks in a data band instead of over a servo band, and the lateral position of the tape head is unknown, and information about the lateral position is lost. Further, servo information is lost during movement of the servo head between servo bands since the servo head is unable to provide servo information.

Figure 4:
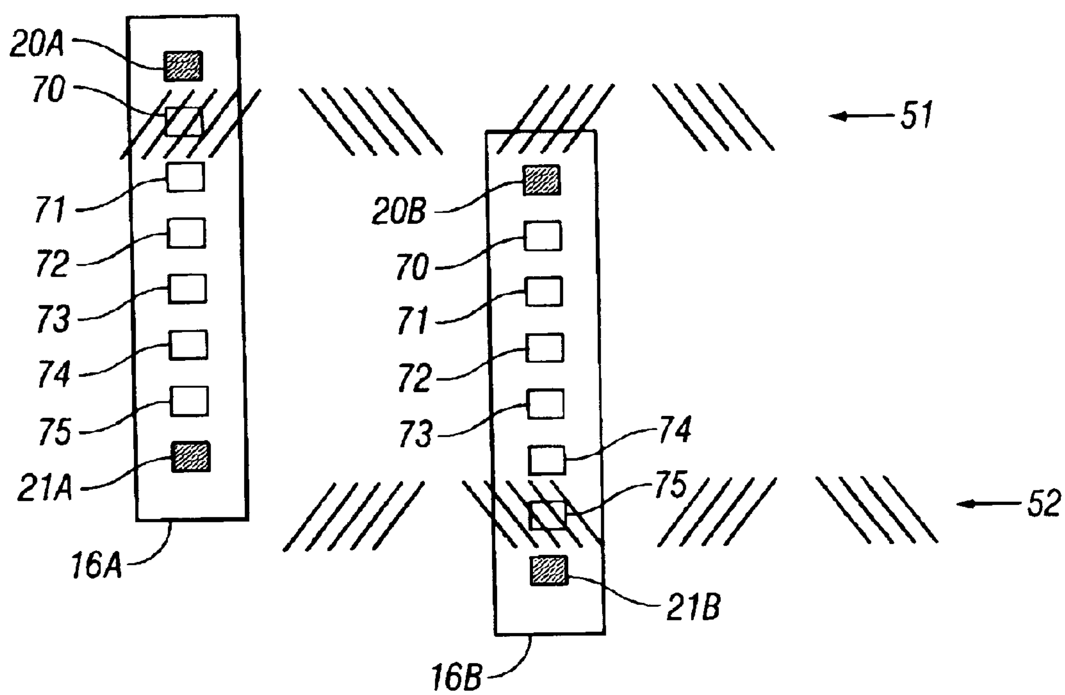
FIG. 4 is a representation of patterns of two separate servo bands of FIG. 1, and a tape head employed in accordance with the present invention for responding to loss of information about the lateral position by detection of a servo signal representing one of the servo bands from a sensed data read transducer.

Referring to FIG. 4, two servo bands 51 and 52 of a magnetic tape are illustrated. The tape head is shown in two positions, illustrated as tape head 16A and tape head 16B respectively, in which information about the lateral position of the tape head 16 of FIG. 1 has been lost, in that the servo heads 20A, 21A of tape head 16A, and the servo heads 20B, 21B of tape head 16B, are not positioned over the servo bands 51 or 52.

Figure 5:
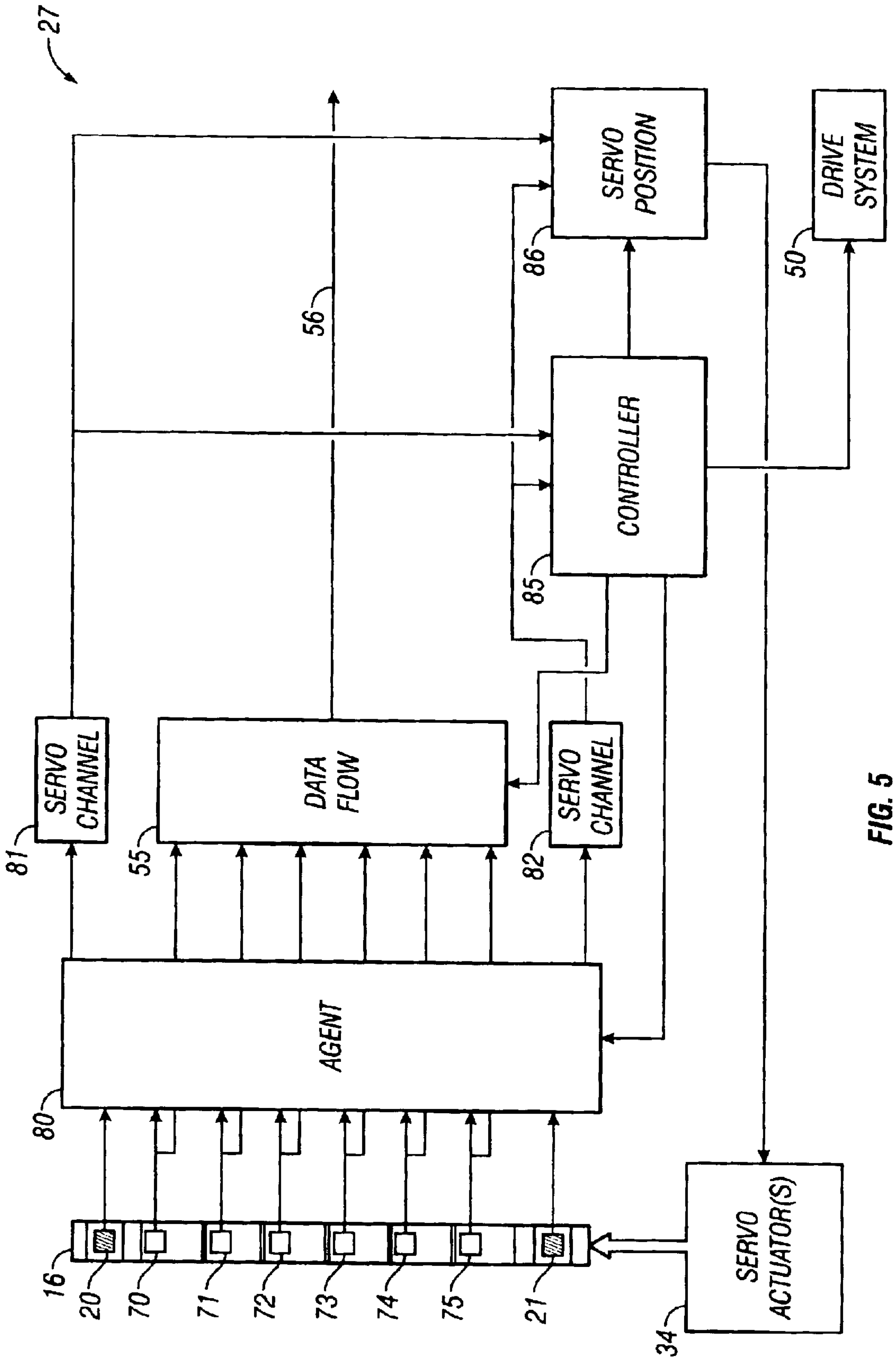
FIG. 5 is a schematic representation of an embodiment of a servo system of the magnetic tape drive of FIG. 3 which responds to loss of the lateral position of the tape head, to recover the lateral position in accordance with the present invention.

Referring additionally to FIGS. 3 and 5, the control system 27 responds to loss of information about the lateral position, operating a drive system 50, comprising motors 29A, 29B, to move the magnetic tape at a longitudinal velocity within a predetermined velocity window. The velocity range of the window is such that servo transitions from a servo band 51 or 52 can be sensed by a data read transducer and detected by a servo read channel. This may be the same velocity range as required for servo detection by the servo heads and, as such, the tape may already be moving at a velocity within the window. In FIGS. 4 and 5, only data read transducers 70, 71, 72, 73, 74 and 75 are illustrated. The data write transducers are typically aligned with the data read transducers in the longitudinal direction of the tape so that the data read transducers may be employed to provide a read after write check of data that is written to magnetic tape.

When the servo heads are positioned over the servo bands, the data read transducers 70, 71, 72, 73, 74 and 75 typically supply the data signals to a data flow system 55 having a data output 56. In accordance with the present invention, when the servo heads 20, 21 are positioned over the servo bands, they supply the servo signals, via an agent 80, such as a multiplexor switch, to servo channels 81 and 82, which detect the servo signals and, via controller 85, operates servo position system 86 to operate the actuator 34 to position the tape head 16 laterally with respect to the magnetic tape, to move the head between the defined servo bands and the index positions within the defined servo bands, and to track follow the desired servo bands. Controller 85 may comprise at least one programmable computer processor operating under the control of program code. The programmable computer processor may comprise any processor or microprocessor device known in the art. The method of the present invention may be provided in the form of a computer program product usable with a programmable computer processor having computer readable program code embodied therein, and may be supplied to the programmable computer processor in any of various ways as are known to those of skill in the art. Alternatively, controller 85 may comprise discrete logic, ASIC (application specific integrated circuit), FPGA (field programmable gate array), etc.

In one embodiment of the invention, in response to loss of information about the lateral position, such as illustrated in FIG. 4, controller 85 of control system 27 of FIG. 5 operates the drive system 50 to move the magnetic tape at a longitudinal velocity within a predetermined velocity window, as discussed above. In an embodiment where the actuator 34 comprises at least a coarse actuator 36, the control system 27 additionally responds to the loss of information about the lateral position, operating the coarse actuator to hold steady.

The controller 85 further operates the agent 80 to selectively direct signals sensed by the data read transducers 70, 71, 72, 73, 74 and 75 to the servo read channels 81 and 82.

In an embodiment of the present invention, the control system 27 operates the switching agent 80 to selectively direct signals sensed by the data read transducers to the servo read channels in a sequence. In one example, the sequence is from the laterally outermost of the tape head to the center of the tape head. In one example, if only servo read channel 81 was to receive the signals from the data read transducers, the sequence may be, first, data read transducer 70; then, data read transducer 75; then, data read transducer 71; then, data read transducer 74; then, data read transducer 72; and lastly, data read transducer 73. In another example, if both servo read channel 81 and servo read channel 82 were to receive the signals from the data read transducers, the sequence may be, first, data read transducers 70 and 75; then, data read transducers 71 and 74; and lastly, data read transducers 72 and 73. Alternatively, some of the data read transducers may be skipped to speed the sequential sensing while providing adequate coverage of the tape.

Upon a servo read channel 81, 82 detecting a servo signal representing one of the servo bands from a sensed data read transducer, the control system 27 determines which data read transducer sensed the detected servo signal, and determines the position of the tape head with respect to the detected servo band based upon the position of the data read transducer having the detected servo signal.

As one example, referring to FIG. 4, with the tape head in the position depicted by tape head 16A, data read transducer 70 senses the servo signal, and, with the tape head in the position depicted by tape head 16B, data read transducer 75 senses the servo signal.

Referring to FIG. 5, by controlling the switching of the outputs of the data read transducers in a sequence, the point in the sequence that the servo signal is sensed, allows the controller 85 to identify the data read transducer sensing the servo signal. For example, if the sequence is such that data read transducer 70 is sensed first and if no servo signal is detected, the data read transducer 75 is sensed second, the identification when the tape head is in the position 16A of FIG. 4, is of the first sensed data read transducer, and, when the tape head is in the position 16B, the identification is of the second sensed data read transducer. When data read transducers 70 and 75 are both sensed first, the identification also requires the indication of the servo read channel detecting the servo signal to differentiate between the data read transducers.

Referring to FIGS. 3, 4 and 5, in one embodiment of the invention, in response to loss of information about lateral position, and upon operating the agent 80 and servo read channels 81 and 82, wherein one of the servo read channels detects a servo signal, the control system 27 determines which transducer sensed the detected servo signal, and determines the lateral motion by the actuator 34 of the tape head 16 required to move a selected servo head 20, 21 toward the servo band sensed by the data read transducer, and operates the servo actuator accordingly.

Where at least one servo head 20, 21 is provided at either lateral side of the plurality of data read transducers of the tape head 16, in one embodiment of the present invention, the control system 27 additionally determines the direction of motion of the tape head required to move a selected servo head toward the servo band at or toward the position of the data read transducer that sensed the detected servo signal. Thus, if the tape head is in the position 16A, and the servo head 20A selected, for example because it is closest to the data read transducer 70 which sensed the servo signal, the controller 85 selects the direction, down in the illustration, to move the tape head 16A, so that the servo head will be moved toward the servo band. The controller 85 of FIG. 5 further determines the lateral motion by the actuator 34 of the tape head 16 required to move a servo head 20 of the tape head laterally to the servo band sensed by the data read transducer 70 having the detected servo signal. The direction, and potential distance, may be provided in a table and looked up.

It may be possible, if sufficient SNR (Signal to Noise Ratio) exists, to determine where over the servo band the data read transducer is. In that case, the selected servo head 20, 21 may be moved toward the center of the servo band, not necessarily to the position where the data read transducer is. For example, if, when the servo pattern is detected, the data read transducer is at the edge of the servo band, moving the selected servo head to the position of the data read transducer that detected the servo pattern would position the servo head at the edge of the servo band, but only if the tape did not move. In the case where the tape moves, the servo head might end up positioned off the servo band, again not allowing servo detection. Hence, moving the selected servo head toward the center of the servo band provides a good opportunity to position the servo head on the servo band.

If the servo bands are identifiable, if may be possible, if sufficient SNR exists, to determine which servo band the data read transducer is detecting. In that case, the control system may not select and move the closest servo head 20, 21 toward the servo band detected by the data read transducer, because it might not be the desired servo band and may be in a direction away from the desired servo band. Hence, the other servo head may be selected and thus the tape head is moved in a direction toward the desired servo band.

Additionally, the control system 27 may, upon determining the lateral motion, operate the servo position system 86 to cause the actuator 34 to position the tape head laterally in accordance with the determined lateral motion. In an embodiment where the actuator comprises at least a coarse actuator 36 of FIG. 3, the control system 27 operates the coarse actuator 36 to position the tape head laterally in accordance with the determined lateral motion to move a servo head of the tape head laterally toward the position of the servo band sensed by the data read transducer having the detected servo signal.

Still referring to FIGS. 3, 4 and 5, in another embodiment of the present invention, where the tape head 16 is moved between servo bands, the present invention monitors the progress of the tape head. To monitor lateral movement during coarse actuation, the tape is moved longitudinally within the velocity window. For example, as the servo heads 20, 21, during a coarse actuation, are moved from the servo bands, such that servo signals are no longer detected by the servo heads and servo channels 81, 82, the control system 27 operates the agent 80 to direct signals sensed by the data read transducers 70, 71, 72, 73, 74, 75 to servo channels 81, 82, for example, in a sequence, to monitor lateral movement of the tape head. As an example, as a seek is started from one servo band to another, the servo channels 81, 82 continue to monitor the servo signal from the servo heads until they disappear. Then, control system 27 operates the agent 80 to activate the data read transducer that should be over the servo band next, and monitor the servo signal until it disappears from that one, and then change to the next data read transducer, etc. In this way, the servo system follows a coarse actuation throughout that actuation to have the ability to know definitely that the tape head 16 left one servo band and entered another.

Figure 6:
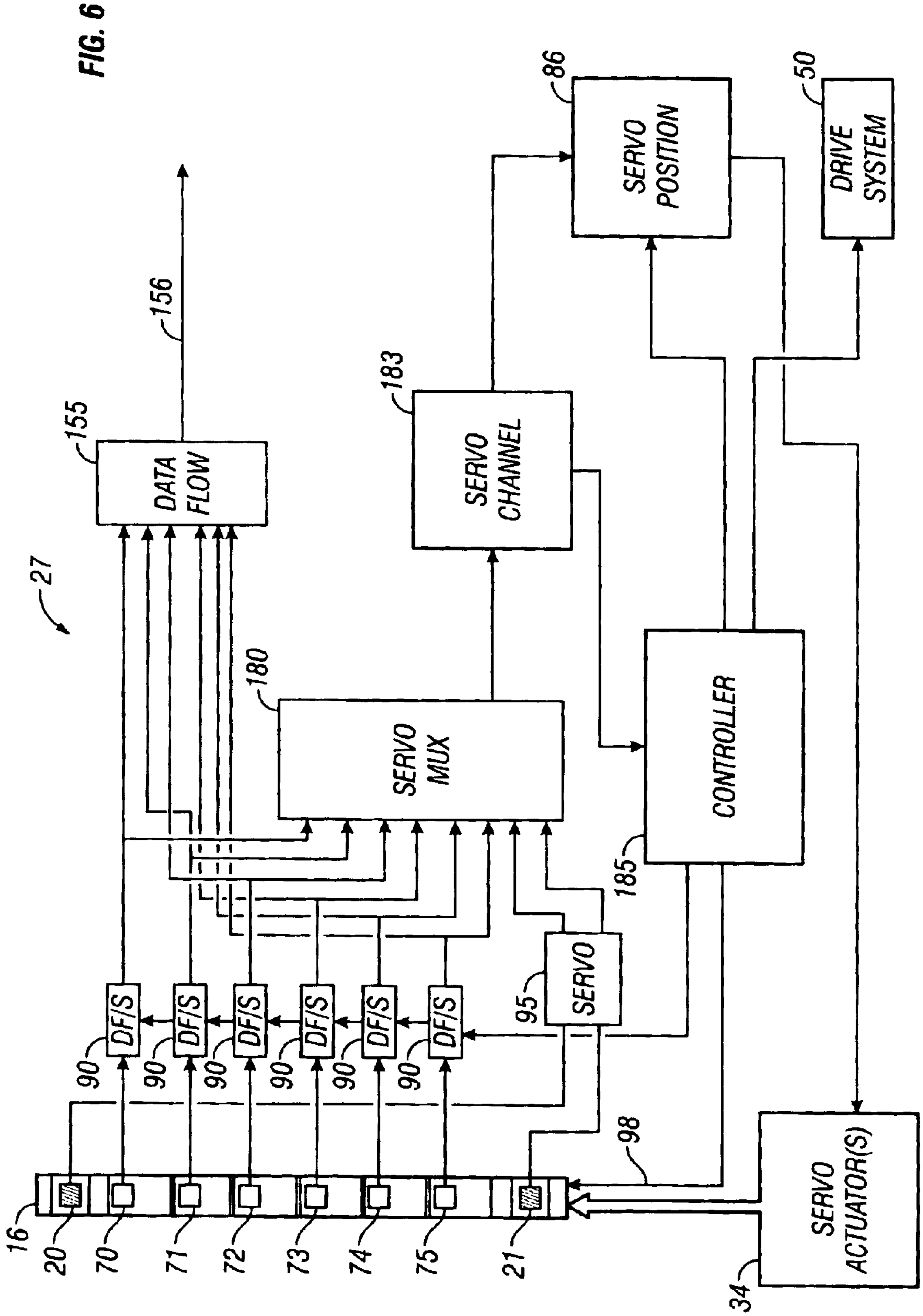
FIG. 6 is a schematic representation of an alternative embodiment of a servo system of the magnetic tape drive of FIG. 3 which responds to loss of the lateral position of the tape head, to recover the lateral position in accordance with the present invention.

An alternative arrangement of a control system 27 is illustrated in FIG. 6. When the servo heads are positioned at the servo bands, the controller 185 switches the data read transducers 70, 71, 72, 73, 74 and 75 to supply the data signals to analog circuits 90. The analog circuits are switched to handle data signals, and they supply the data signals to a data flow system 155 having a data output 156. In accordance with the present invention, when the servo heads 20, 21 are positioned at the servo bands, they supply the servo signals, via servo analog circuits 95 and multiplexor 180 to a servo channel 183, which detects the servo signals and, via controller 185, operates servo position system 86 to operate the actuator 34 to position the tape head 16 laterally with respect to the magnetic tape to move the head between the defined servo bands and the index positions within the defined servo bands, and to track follow the desired index position. Controller 185 is similar to controller 85 of FIG. 5 and may comprise at least one programmable computer processor operating under the control of program code. The programmable computer processor may comprise any processor or microprocessor device known in the art. Alternatively, controller 185 may comprise discrete logic, ASIC (application specific integrated circuit), FPGA (field programmable gate array), etc.

In response to loss of information about lateral position, such as illustrated in FIG. 4, controller 185 of control system 27 of FIG. 6 operates the drive system 50 to move the magnetic tape at a longitudinal velocity within a predetermined velocity window, as discussed above. In an embodiment where the actuator 34 comprises at least a coarse actuator 36 of FIG. 3, the control system 27 may additionally respond to the loss of the lateral position, operating the coarse actuator to hold steady.

The controller 185 of FIG. 6, further, at input 98, switches the tape head data read transducers 70, 71, 72, 73, 74 and 75 to selectively provide their outputs to the analog circuits 90 in a sequence. As is understood by those of skill in the art, power may be supplied to a magneto-resistive read transducer to activate the transducer. Further, the controller 185 switches the analog circuits 90 to handle servo signals. For example, the servo signals might be sensed at 1/50 the frequency of the data signals. Thus, input 98 comprises the agent for selectively directing signals sensed by the data read transducers.

In an embodiment of the present invention, the control system 27 operates the agent 98 to selectively direct signals sensed by the data read transducers to the servo read channels in a sequence, for example, from the laterally outermost of the tape head to the center of the tape head. In one example, if the data read transducers are selected one at a time, the sequence may be, first, data read transducer 70; then, data read transducer 75; then, data read transducer 71; then, data read transducer 74; then, data read transducer 72; and lastly, data read transducer 73. In another example, if two data read transducers are selected at a time, the sequence may be, first, data read transducers 70 and 75; then, data read transducers 71 and 74; and lastly, data read transducers 72 and 73.

The signals from the selected data read transducers are provided by the analog circuits 90, via the servo multiplexor 180 to the servo channel 183.

Upon the servo read channel 183 detecting a servo signal representing one of the servo bands from a sensed data read transducer, the control system 27 determines which data read transducer sensed the detected servo signal, and determines the lateral position of the tape head with respect to the detected servo band based upon the position of the data read transducer that sensed the detected servo signal.

As one example, referring to FIG. 4, with the tape head in the position depicted by tape head 16A, data read transducer 70 senses the servo signal, and, with the tape head in the position depicted by tape head 16B, data read transducer 75 senses the servo signal.

Referring to FIG. 6, by controlling the switching of the outputs of the data read transducers in a sequence, the point in the sequence that the servo signal is sensed, allows the controller 185 to identify the data read transducer sensing the servo signal. For example, if the sequence is such that data read transducer 70 is sensed first and data read transducer 75 is sensed second, the identification when the tape head is in the position 16A of FIG. 4, is of the first sensed data read transducer, and, when the tape head is in the position 16B, the identification is of the second sensed data read transducer. When data read transducers 70 and 75 are both sensed first, the identification also requires the indication of which servo read channel detected the servo signal to differentiate between the data read transducers.

As discussed above, the control system 27 may additionally determine the lateral distance motion by the actuator 34 of FIG. 3 required to move a selected servo head 20, 21 of tape head 16 of FIG. 6 toward the servo band sensed by the data read transducer that sensed the detected servo signal.

Where at least one servo head 20, 21 is provided at either lateral side of the plurality of data read transducers of the tape head 16, in one embodiment of the present invention, the control system 27 additionally determines the direction of motion of the tape head required to move a selected servo head toward the servo band at or toward the position of the data read transducer that sensed the detected servo signal. Thus, if the tape head is in the position 16A of FIG. 4, the servo head 20A may be selected, for example, as closest to data read transducer 70 which sensed the servo signal. As discussed above, another servo head may be selected to move the tape head toward a desired servo band. Therefore, the controller 185 of FIG. 6 selects the direction, down in the illustration of FIG. 4, to move the tape head 16A, so that the servo head will be moved toward the servo band. The controller 185 of FIG. 6 further determines the lateral distance motion by the actuator 34 of the tape head 16 required to move a servo head 20 of the tape head laterally toward the desired position, such as the position of the data read transducer 70 having the detected servo signal, or toward the center of the servo band. The direction and distance may be provided in a table and looked up.

Additionally, the control system 27 may, upon determining the lateral motion, operate the servo position system 86 to cause the actuator 34 to position the tape head laterally in accordance with the determined lateral motion. In an embodiment where the actuator comprises at least a coarse actuator 36 of FIG. 3, the control system 27 operates the coarse actuator 36 of to position the tape head laterally in accordance with the determined lateral motion to move a servo head of the tape head laterally toward the position of the servo band sensed by the data read transducer having the detected servo signal, etc.

Also as discussed above, the control system 27 of FIG. 6 may monitor the progress of the tape head 16 during a coarse actuation between servo bands. To monitor lateral movement during coarse actuation, the tape is moved longitudinally within the velocity window. For example, as the servo heads 20, 21 are moved from the servo bands, such that servo signals are no longer detected by the servo heads and servo channel 183, the control system 27 operates the agent 198 to direct signals sensed by the data read transducers 70, 71, 72, 73, 74, 75 to the servo channel 183 to monitor lateral movement of the tape head.

Figure 7:
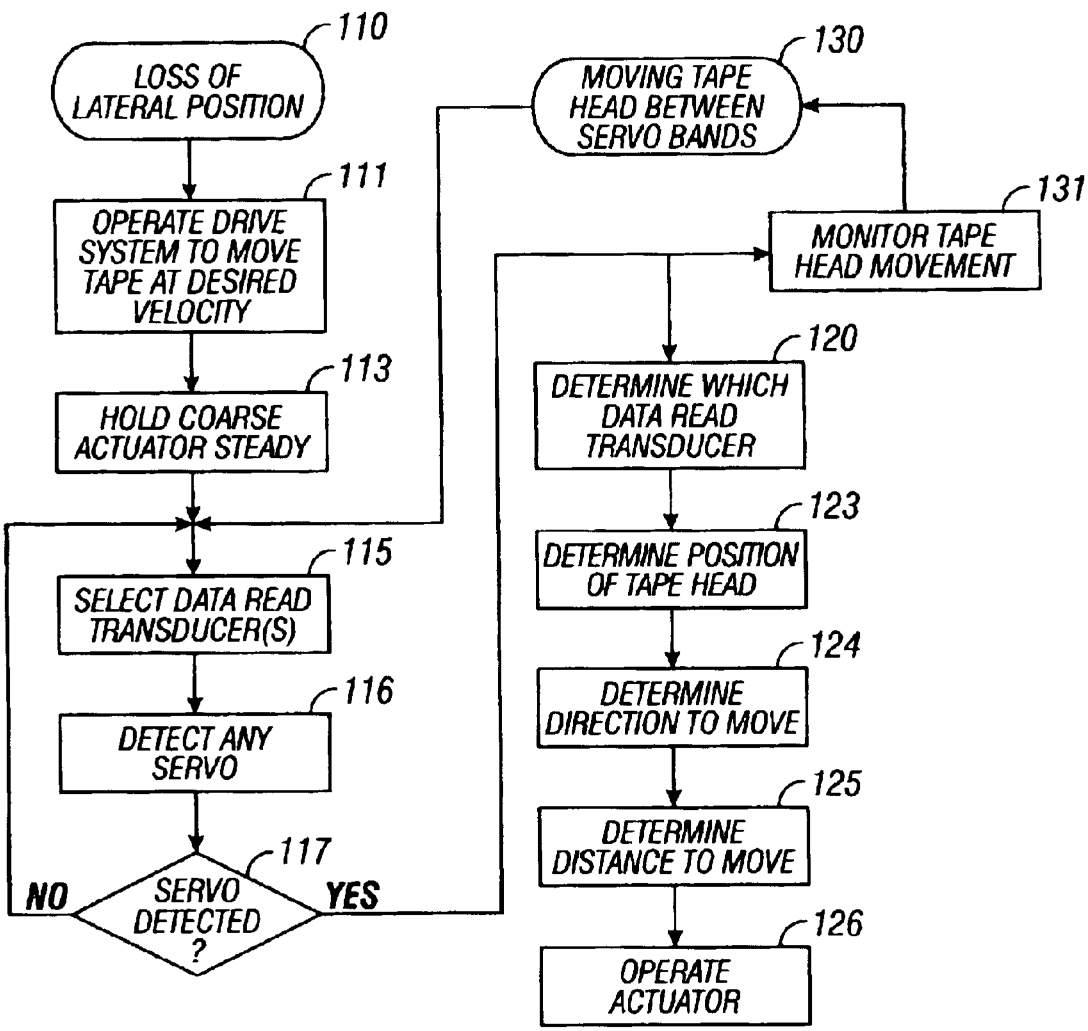
FIG. 7 is a flow chart depicting embodiments of the method of the present invention as conducted by the servo systems of FIGS. 5 and 6.

An embodiment of a computer-implemented method of the present invention as conducted by the servo systems of FIGS. 5 and 6 is illustrated in FIG. 7. The method of the present invention may be provided in the form of a computer program product usable with a programmable computer processor having computer readable program code embodied therein, and may be supplied to the programmable computer processor in any of various ways as are known to those of skill in the art. Alternatively, the method may be provided in the form of logic, and may comprise discrete logic, ASIC (application specific integrated circuit), FPGA (field programmable gate array), etc.

In one embodiment, loss of information about lateral position by the servo system in step 110 leads to step 111 in which the control system 27 of FIG. 5 or control system 27 of FIG. 6 moves the magnetic tape at a longitudinal velocity within a predetermined velocity window, as discussed above. In an embodiment where the actuator comprises at least a coarse actuator, the control system, in step 113 additionally responds to the loss of the lateral position, operating the coarse actuator to hold steady.

In step 115, the control system selectively directs signals sensed by the data read transducers 70, 71, 72, 73, 74 and 75 to the servo read channel(s), for example, in a sequence. Thus, in step 115 the control system 27 operates the switching agent to selectively direct signals sensed by the first selected data read transducer or transducers of the sequence to the servo read channel(s). In one example, the first may be data read transducer 70.

In step 116 of FIG. 7, the servo read channel(s) detects any servo signal sensed by the selected data read transducer (s), and step 117 determines if any servo signal was detected. If not, step 117 leads back to step 115 to select the next data read transducer(s) in the sequence. In the example, the next data read transducer selected would be data read transducer 75 of FIG. 4. The selection of steps 115, 116 and 117 of FIG. 7 continues to move along in the sequence. If the tape head were in the position depicted by position 16B of FIG. 4, data read transducer 75 would sense a servo signal, which is detected in steps 116 and 117.

Upon a servo read channel detecting a servo signal representing one of the servo bands from a sensed data read transducer, the control system, in step 120, determines which data read transducer sensed the detected servo signal.

In step 123, the control system determines the lateral position of the tape head with respect to the detected servo band based upon the position of the data read transducer that sensed the detected servo signal.

Where at least one servo head 20, 21 is provided at either lateral side of the plurality of data read transducers of the tape head 16 of FIG. 4, in one embodiment of the present invention, the control system, in step 124, determines the direction of motion of the tape head required to move a selected servo head to the position of the servo band sensed by the data read transducer having the detected servo signal. Thus, if the tape head is in the position 16B, the servo head 21B may be selected, and the control system selects the direction, up in the illustration, to move the tape head 16B, so that the servo head will be moved toward the servo band.

In step 125 of FIG. 7, the control system determines the lateral distance motion by the actuator of the tape head required to move a servo head of the tape head laterally toward the desired the position, such as the center of the servo band or the position of the data read transducer having the detected servo signal. As discussed above, the direction and distance may be provided in a table and looked up.

Additionally, in step 126, the control system may, upon determining the lateral motion, operate the servo position system to cause the actuator to position the tape head laterally in accordance with the determined lateral motion. In an embodiment where the actuator 34 comprises at least a coarse actuator 36 of FIG. 3, the control system 27 operates the coarse actuator 36 to position the tape head laterally in accordance with the determined lateral motion to move a servo head of the tape head laterally toward the desired position.

In another embodiment of the present invention, step 130 comprises initiation of a coarse actuation between servo bands. In step 130, as the coarse actuation is begun, the servo system continues to monitor the servo signal from the servo heads until they disappear. The drive system is operated at the desired velocity window as a part of the coarse actuation in this instance. Then, in step 115, the control system selectively directs signals sensed by the data read transducers 70, 71, 72, 73, 74 and 75 to the servo read channel(s) in a sequence so as to monitor the progress of the actuation. Thus, in step 115, the control system 27 operates the switching agent to selectively direct signals sensed by the first selected data read transducer or transducers of the sequence to the servo read channel(s). In one example, the first may be data read transducer 70 of FIG. 4.

In step 116 of FIG. 7, the servo read channel(s) detects the servo signal sensed by the selected data read transducer, and step 117 determines if any servo signal was detected. If not, step 117 leads back to step 115 to continue sensing of the selected data read transducer.

Upon a servo read channel detecting a servo signal representing the servo band from the selected sensed data read transducer, the control system, in step 131, monitors the progress of the tape head, and, if the servo band is not due to be detected by a servo head, returns to step 130 to continue monitoring the progress of the tape head. Step 130, if the monitoring is to continue, leads to step 115 to select the next data read transducer to sense the servo signal. In the example, the next data read transducer selected would be data read transducer 71 of FIG. 4. The selection of steps 115, 116 and 117 of FIG. 7 continues to move along in the sequence. The monitoring continues until step 131 indicates that the servo band is due to be detected by a servo head, and discontinues monitoring.

Detection of the servo signal may be accomplished in many ways, and is a function of the servo system architecture. As one example, as depicted in FIG. 5, the servo signals are multiplexed at the analog front end so that the data read transducer is read detected and processed by circuits which are nominally used for processing servo signals. In another example, as depicted in FIG. 6, the servo signals are multiplexed above the servo front end, but before the read detection. Still another example comprises multiplexing after read detection by a read detector nominally used for detecting data from data tracks. In a further example, there is no multiplexing, and instead standard data channel processing is used up to and including read detection, but including pattern detection in each read channel to allow sensing of the asynchronous pulse stream to look for a pattern frequency which appears to be a servo pattern. A still further example comprises duplicating the servo logic to some extent on each data channel. The servo logic may be duplicated to the extent of actually being able to calculate the position error signal, or only to allow band identification, or to do both.

Alternative sequences of data read transducer selection may also vary depending on the layout of the servo transducers and the servo bands. Generally, it is best to sense the data read transducer near the servo head first, then work away. For example, if a tape drive has a servo head at the center of the tape head, half of the data read transducers may be on one side of the servo head and the other half on the other side. In this case, the innermost data read transducers would be selected first.

The illustrated components of the control system(s) 27 of FIGS. 5 and 6, and the tape drive of FIG. 3 may be varied, combined, or combined functions may be separated, as is known to those of skill in the art. The illustrated steps of FIG. 7 may be altered in sequence, omitted, or other steps added, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A servo system for a magnetic tape drive, said servo system for positioning a tape head laterally with respect to a plurality of parallel, longitudinal servo bands of a magnetic tape, said tape head having a plurality of data read transducers, said magnetic tape drive having a data flow system for reading data sensed by said plurality of data read transducers, said servo system comprising:

at least one servo head positioned on said tape head;

at least one servo read channel for detecting servo signals of said servo bands of said magnetic tape;

a servo actuator for positioning said tape head laterally with respect to said magnetic tape;

an agent for selectively directing signals sensed by said data read transducers of said tape head to said at least one servo read channel; and a control system:

responding to said detected servo signals of said servo bands from said at least one servo read channel for operating said servo actuator to position said tape head laterally with respect to said servo bands;

responding to loss of information about the lateral position of said tape head, operating said agent to selectively direct signals sensed by said data read transducers to said at least one servo read channel; and upon said at least one servo read channel detecting a servo signal representing one of said servo bands from a sensed said data read transducer, determining the lateral position of said tape head with respect to said detected servo band based upon the position of said data read transducer that sensed said detected servo signal.

2. The servo system of claim 1, wherein said control system operates said agent to selectively direct signals sensed by said data read transducers to said at least one servo read channel in a sequence.

3. The servo system of claim 1, wherein said at least one servo head comprises at least one servo head at either lateral side of said plurality of data read transducers of said tape head, and wherein said control system additionally determines the direction of motion of said tape head required to move a selected said servo head toward the position of said data read transducer that sensed said detected servo signal.

4. The servo system of claim 1, wherein, as said tape head is moved laterally with respect to said magnetic tape, such that said at least one servo head and at least one servo read channel no longer detect said servo signals; said control system operates said agent to direct signals sensed by said data read transducers to said at least one servo read channel to monitor lateral movement of said tape head.

5. The servo system of claim 1, wherein said control system, in response to said loss of information about lateral position, and upon operating said agent and said at least one servo read channel detecting said servo signal from a sensed said data read transducer, determines the lateral distance motion by said servo actuator of said tape head required to move a servo head of said tape head laterally to the servo band sensed by said data read transducer that sensed said detected servo signal; and operates said servo actuator to position said tape head laterally in accordance with said determined lateral motion.

6. The servo system claim 5, wherein said servo actuator comprises at least a coarse actuator; and said control system additionally, in response to said loss of information about said lateral position, operates said coarse actuator to hold steady; and, upon determining said position of said tape head, operates said coarse actuator to position said tape head laterally in accordance with said determined lateral position.

7. The servo recovery system of claim 1, wherein said at least one servo head comprises at least one servo head at either lateral side of said plurality of data read transducers of said tape head, and wherein said control system determines said lateral motion, and additionally determines the direction of motion of said tape head required to move a selected said servo head toward the position of said data read transducer that sensed said detected servo signal.

8. The servo recovery system of claim 7, wherein said at least one servo read channel comprises at least two servo read channels, said servo read channels respectively for said servo heads at either lateral side of said plurality of data read transducers, and wherein said control system operates said agent to selectively direct signals sensed by a separate said data read transducer to each of said servo read channels in a sequence.

9. The servo recovery system of claim 8, wherein said control system operates said agent to selectively direct signals sensed by said data read transducers in a sequence from the laterally outermost of said tape head at both ends of said tape head, to the center of said tape head.

10. A method for recovery of lateral position of a servo system of a magnetic tape drive, said servo system for positioning a tape head laterally with respect to a plurality of parallel, longitudinal servo bands of a magnetic tape, said tape head having at least one servo head and a plurality of data read transducers, said magnetic tape drive having a data flow system for reading data sensed by said plurality of data read transducers, said servo system sensing lateral position of said at least one servo head with respect to at least one of said servo bands, said method comprising:

responding to loss of information about the lateral position of said tape head, selectively senses said data read transducers of said tape head;

detecting servo signal representing said servo bands from said sensed data read transducers; and upon detecting a servo signal representing one of said servo bands from a sensed said data read transducer, determining the lateral position of said tape head with respect to said detected servo band based upon the position of said data read transducer that sensed said detected servo signal.

11. The method of claim 10, wherein said selected sensing step comprises sensing selected said data read transducers in a sequence.

12. The method of claim 10, wherein said servo system comprises at least one servo read channel, and wherein said selected sensing step comprises providing the sensed output of said selected data read transducers to said at least one servo read channel in a sequence.

13. The method of claim 10, wherein said tape head comprises at least one servo head at either lateral side of said plurality of data read transducers, and wherein said lateral position determining step additionally comprises determining the direction of motion of said tape head required to move a selected said servo head to the position of said data read transducer that sensed said detected servo signal.

14. The method of claim 10, wherein, as said tape head is moved laterally with respect to said magnetic tape, such that said at least one servo head no longer senses servo signals; said method selectively senses said data read transducers to detect servo signals to monitor lateral movement of said tape head.

15. The method of claim 10, wherein, said servo system additionally comprises a servo actuator for positioning said tape head laterally with respect to said magnetic tape; said method, in response to said loss of information about lateral position, and upon conducting said selecting and detecting steps; said determining step comprises determining the lateral distance motion by said servo actuator required to move a servo head of said tape head laterally to the servo band sensed by said data read transducer that sensed said detected servo signal.

16. A magnetic tape drive for reading and/or writing data with respect to a magnetic tape, said magnetic tape having a plurality of parallel, longitudinal servo bands and a plurality of data tracks parallel to and separating said servo bands, comprising:

- a tape head having at least one servo head and a plurality of data read and/or write transducers;
- a drive system for moving a magnetic tape longitudinally with respect to said tape head to allow said at least one servo head and the plurality of data read transducers of said data read and/or write transducers to sense said magnetic tape;
- a data flow system for reading and/or writing data from said magnetic tape with respect to said data read and/or write transducers;
- at least one servo head positioned on said tape head;
- at least one servo read channel for detecting servo signals of said servo bands of said magnetic tape;
- a servo actuator for positioning said tape head laterally with respect to said magnetic tape;
- an agent for selectively directing signals sensed by said data read transducers of said tape head to said at least one servo read channel; and
- a control system:
  - responding to said detected servo signals of said servo bands from said at least one servo read channel for operating said servo actuator to position said tape head laterally with respect to said servo bands;
  - responding to loss of information about the lateral position of said tape head, operating said agent to selectively direct signals sensed by said data read transducers to said at least one servo read channel; and
  - upon said at least one servo read channel detecting a servo signal representing one of said servo bands from a sensed said data read transducer, determining the lateral position of said tape head with respect to said detected servo band based upon the position of said data read transducer that sensed said detected servo signal.

17. The magnetic tape drive of claim 16, wherein said control system operates said switching agent to selectively direct signals sensed by said data read transducers to said at least one servo read channel in a sequence.

18. The magnetic tape drive of claim 16, wherein said at least one servo head comprises at least one servo head at either lateral side of said plurality of data read transducers of said tape head, and wherein said control system additionally determines the direction of motion of said tape head required to move a selected said servo head toward the position of said data read transducer that sensed said detected servo signal.

19. The magnetic tape drive of claim 16, wherein, as said tape head is moved laterally with respect to said magnetic tape, such as that said at least one servo head and at least one servo read channel no longer detect said servo signals; said control system operates said agent to direct signals sensed by said data read transducers to said at least one servo read channel to monitor lateral movement of said tape head.

20. The magnetic tape drive of claim 16, wherein said control system, in response to said loss of information about lateral position, and upon operating said agent and said at least one servo read channel detecting said servo signal from a sensed said data read transducer,

- determines the lateral distance motion by said servo actuator of said tape head required to move a servo head of said tape head laterally to the servo band sensed by said data read transducer that sensed said detected servo signal; and
- operates said servo actuator to position said tape head laterally in accordance with said determined lateral motion.

21. The magnetic tape drive of claim 20, wherein said servo actuator comprises at least a coarse actuator; and said control system additionally, in response to said loss of information about said lateral position, operates said coarse actuator to hold steady; and, upon determining said position of said tape head, operates said coarse actuator to position said tape head laterally in accordance with said determined lateral position.

22. A servo recovery system for recovery of lateral position of a servo system of a magnetic tape drive, said servo system for positioning a tape head laterally with respect to a plurality of parallel, longitudinal servo bands of a magnetic tape, said tape head having at least one servo head and a plurality of data read transducers, said magnetic tape drive having a drive system for moving a magnetic tape longitudinally with respect to said tape head, said servo system sensing lateral position of said at least one servo head with respect to at least one of said servo bands, said servo system comprising at least one servo read channel for detecting servo signals of said servo bands of said magnetic tape, said servo recovery system comprising:

- an agent for selectively directing signals sensed by said data read transducers of said tape head to said at least one servo read channel; and
- a control system:
  - responding to loss of information about the lateral position of said tape head, operating said drive system to move said magnetic tape at a longitudinal velocity within a predetermined velocity window;
  - operating said agent to selectively direct signals sensed by said data read transducers to said at least one servo read channel; and upon said at least one servo read channel detecting a servo signal representing one of said servo bands from a sensed said data read transducer, determining the lateral distance motion of said tape head required to move a servo head of said tape head laterally to the position of said data read transducer that sensed said detected servo signal.

23. The servo recovery system of claim 22, wherein said control system operates said agent to selectively direct signals sensed by said data read transducers to said at least one servo read channel in a sequence.

24. The servo recovery system of claim 22, wherein said servo system comprises a servo actuator for positioning said tape head laterally with respect to said magnetic tape; and said control system additionally responds to said loss of said lateral position, operates said actuator to hold steady; and, upon determining said lateral motion, operates said actuator to position said tape head laterally in accordance with said determined lateral motion to move a servo head of said tape head laterally to the position of said data read transducer that sensed said detected servo signal.

25. A computer program product usable with at least one programmable computer processor having computer readable code embodied therein, said at least one programmable computer processor for operating a servo system of a magnetic tape drive, said servo system for positioning a tape head laterally with respect to a plurality of parallel, longitudinal servo bands of a magnetic tape, said tape head having at least one servo head and a plurality of data read transducers, said magnetic tape drive having a data flow system for detecting data sensed by said plurality of data read transducers, said servo system sensing lateral position of said at least one servo head with respect to at least one of said servo bands, said computer program product comprising:

computer readable program code causing said at least one programmable computer processor to respond to loss of information about the lateral position of said tape head, operating said servo system to selectively sense said data read transducers of said tape head;

computer readable program code causing said at least one programmable computer processor to operate said servo system to detect servo signals representing said servo bands from said sensed data read transducers; and computer readable program code causing said at least one programmable computer processor to, upon said servo system detecting a servo signal representing one of said servo bands from a sensed said data read transducer, determine the lateral position of said tape head with respect to said detected servo band based upon the position of said data read transducer that sensed said detected servo signal.

26. The computer program product of claim 25, wherein said computer readable program code causing said at least one programmable computer processor to operate said servo system to sense selected said data read transducers of said tape head, comprises causing said at least one programmable computer processor to operate said servo system to sense selected said data read transducers in a sequence.

27. The computer program product of claim 25, wherein said servo system comprises at least one servo read channel, and wherein said computer readable program code causing said at least one programmable computer processor to operate said servo system to sense selected said data read transducers of said tape head, comprises causing said at least one programmable computer processor to operate said servo system to provide the sensed output of said selected data read transducers to said at least one servo read channel in a sequence.

28. The computer program product of claim 25, wherein said tape head comprises at least one servo head at either lateral side of said plurality of data read transducers, and wherein said computer readable program code causing said at least one programmable computer processor to determine the lateral position of said detected servo band, additionally comprises computer readable program code causing said at least one programmable computer processor to determine the direction of motion of said tape head required to move a selected said servo head toward the position of said data read transducer that sensed said detected servo signal.

29. The computer program product of claim 25, wherein, as said tape head is moved laterally with respect to said magnetic tape, such that said at least one servo head no longer senses servo signals; said computer readable program code causing said at least one programmable computer processor to operate said servo system to selectively sense selected said data read transducers of said tape head and to detect servo signals, comprise causing said at least one programmable computer processor to operate said servo system to selectively sense said data read transducers and detect servo signals to monitor lateral movement of said tape head.

30. The computer program product of claim 25, wherein said servo system additionally comprises a servo actuator for positioning said tape head laterally with respect to said magnetic tape; and wherein said computer readable program code causing said at least one programmable computer processor to determine the lateral position of said detected servo band, additionally comprises computer readable program code causing said at least one programmable computer processor, in response to said loss of information about said lateral position, to determine the lateral distance motion by said servo actuator required to move a servo head of said tape head laterally to the servo band sensed by said data read transducer that sensed said detected servo signal.

* * * * *

UNITED STATES PATENT AND TRADEMARK OFFICE

CERTIFICATE OF CORRECTION

PATENT NO. : 6,940,682 B2
APPLICATION NO. : 10/660436
DATED : September 6, 2005
INVENTOR(S) : Bui et al.

It is certified that error appears in the above-identified patent and that said Letters Patent is hereby corrected as shown below:

Claim 7 Col. 14 line 25 Change “claim 1” to --claim 22--

Signed and Sealed this

Twenty-sixth Day of August, 2008

JON W. DUDAS
*Director of the United States Patent and Trademark Office*